(12) United States Patent
Hongo

(10) Patent No.: US 10,742,371 B2
(45) Date of Patent: Aug. 11, 2020

(54) WIRELESS COMMUNICATION SYSTEM

(71) Applicant: HITACHI KOKUSAI ELECTRIC INC., Tokyo (JP)

(72) Inventor: Naoki Hongo, Tokyo (JP)

(73) Assignee: HITACHI KOKUSAI ELECTRIC INC., Tokyo (JP)

(*) Notice: Subject to any disclaimer, the term of this patent is extended or adjusted under 35 U.S.C. 154(b) by 0 days.

(21) Appl. No.: 16/485,523

(22) PCT Filed: Feb. 13, 2018

(86) PCT No.: PCT/JP2018/004862
§ 371 (c)(1),
(2) Date: Aug. 13, 2019

(87) PCT Pub. No.: WO2018/155252
PCT Pub. Date: Aug. 30, 2018

(65) Prior Publication Data
US 2019/0372725 A1 Dec. 5, 2019

(30) Foreign Application Priority Data
Feb. 23, 2017 (JP) .................................. 2017-032453

(51) Int. Cl.
*H04L 5/00* (2006.01)
*H04L 27/26* (2006.01)
(Continued)

(52) U.S. Cl.
CPC .......... *H04L 5/001* (2013.01); *H04L 27/2627* (2013.01); *H04W 72/082* (2013.01); *H04W 72/044* (2013.01)

(58) Field of Classification Search
CPC ......... H04B 1/10; H04B 7/08; H04L 27/2627; H04L 5/001; H04L 27/26; H04W 72/082
See application file for complete search history.

(56) References Cited

U.S. PATENT DOCUMENTS

2006/0140295 A1* 6/2006 Jeong .................... H04L 25/022
375/260
2012/0009965 A1 1/2012 Nakamura

FOREIGN PATENT DOCUMENTS

| JP | 2008-312188 A | 12/2008 |
| JP | 2009-225111 A | 10/2009 |
| JP | 5413453 B2 | 11/2013 |

OTHER PUBLICATIONS

K. Sathananthan et al., "Analysis of OFDM in the presence of frequency off set and a method to reduce performance degradation", IEEE Global Telecommunications Conference, 2000. GLOBECOM' 00, Dec. 1, 2000, vol. 1, pp. 72-76, Section III.

(Continued)

*Primary Examiner* — Anez C Ebrahim
(74) *Attorney, Agent, or Firm* — Bacon & Thomas, PLLC

(57) ABSTRACT

A wireless communication system includes a transmitter that discretely inserts null subcarriers into an OFDM-demodulated signal in time and frequency domains, and a receiver that receive signals by a first and second antennas. The receiver calculates a complex coefficient wherein a result of multiplying a first reception vector for each of the null subcarriers received by the first antenna by the complex coefficient is equal to an amplitude of a second reception vector of the corresponding null subcarrier received by the second antenna and is opposite in phase thereto, calculates a fourth reception vector by multiplying a third reception vector of any data subcarrier received by the first antenna by a coefficient that is obtained by interpolating the complex coefficient, and adds the fourth reception vector to a fifth reception vector of the any data subcarrier received by the second antenna.

2 Claims, 13 Drawing Sheets

(51) Int. Cl.
*H04W 72/08* (2009.01)
*H04W 72/04* (2009.01)

(56) References Cited

OTHER PUBLICATIONS

International Search Report dated Apr. 24, 2018.
K. Sathananthan et al, "Analysis of OFDM in the presence of frequency off set and a method to reduce performance degradation", IEEE Global Telecommunications Conference, 2000. GLOBECOM'00, Dec. 1, 2000, vol. 1, pp. 72-76, Sec. III.
International Search Report in corresponding International Appln. No. PCT/JP2018/004862 dated Apr. 13, 2018.

* cited by examiner

*FIG.11*

|       | SINR (ANTENNA_1) | SINR (ANTENNA_2) | DEMODULATION DATA SELECTION |
|-------|------------------|------------------|------------------------------|
| CASE1 | HIGH             | HIGH             | MAXIMUM RATIO SYNTHESIS      |
| CASE2 | HIGH/LOW         | LOW/HIGH         | SELECTION SYNTHESIS          |
| CASE3 | LOW              | LOW              | INTERFERENCE SUPPRESSION     |

WIRELESS COMMUNICATION SYSTEM

TECHNICAL FIELD

The present invention relates to a wireless communication system.

BACKGROUND OF THE INVENTION

In a wireless communication system, a technique of reducing multi-user interference in the same system or interference waves with different modulation methods in the outside of the same system is required to improve a system capacity or to stabilize a system operation. A system which uses multiple antennas is proposed as a method of realizing an interference wave suppression technique.

In order to suppress the multi-user interference in the same system, various methods such as, spatial division multiple access (SDMA) as a multiple access method, a method of performing beamforming by a transmitter, and successive interference canceller (SIC) on a reception side are researched and put into practical use. Among the methods, a technique which uses multiple antennas is a mainstream, and multiple-input multiple-output (MIMO) technique can also transmit and receive multiple streams using the same frequency at the same time. That is, since path separation is possible, such technique is a technique of suppressing interference in a broad sense. Since it is possible to get a location of a user, to manage resource block allocation, or to insert a known signal such as a pilot signal into a radio frame of a transmission signal in advance in the same system, it is possible to easily suppress the interference wave.

Meanwhile, it is not easy to suppress interference waves in the outside of the same system. In a frequency band such as an industry science medical (ISM) band in which an interference wave such as an illegal radio wave and a plurality of communication systems exist together, a modulation method, a bandwidth, and the like are different from each other, and thus, it is impossible to grasp and manage other systems. Under such a circumstance, there is a null control technique of using multiple antennas as illustrated in FIG. 1 as an interference wave suppression technique. FIG. 1 illustrates an example in which the number of antennas is two, and an interval between the antennas is set to a half wavelength of a system of the antennas. By synthesizing amplitudes of two received signals to be equal and phases thereof to be opposite in order to cancel an interference wave, it is possible to extract only a desirable wave from which the interference wave is removed. Various algorithms are proposed as a method of suppressing an interference wave and extracting a desirable wave from two received signals, that is, a method of increasing a desired to undesired (D/U) signal ratio.

PRIOR ART

Patent Document 1: Japanese Patent No. 5413453

A null control technique of using multiple antennas illustrated in FIG. 1 has the following problems.

As the number of interference waves to be suppressed increases, the number of antennas has to increase, N+1 antennas are required to generate nulls for N interference waves, and thereby, a circuit size for controlling an antenna pattern also increases. Further, even when there is only one interference source, multiple antennas are required under a multipath environment where interference waves with long delays that cannot be regarded as the same signals are received. Further, when frequency selective fading is involved in a system bandwidth, an optimal antenna pattern differs depending on a frequency, and thereby, the amount of interference suppression is reduced compared with a view environment or a flat fading environment. An object of the present disclosure is to provide a wireless system suitable for a null control technique which uses multiple antennas. Other objects and novel features will be apparent from the description on a technique of the present specification and the accompanying drawings.

SUMMARY OF THE INVENTION

In accordance with an embodiment of the present disclosure, there is provided a wireless communication system including a transmitter configured to transmit an OFDM-modulated signal, and a receiver configured to receive signals by a first antenna and a second antenna. The transmitter discretely inserts null subcarriers into a transmission signal in time and frequency domains and transmits the transmission signal. The receiver (a) calculates a complex coefficient wherein a result of multiplying a first reception vector for each of the null subcarriers received by the first antenna by the complex coefficient is equal to an amplitude of a second reception vector of the corresponding null subcarrier received by the second antenna and is opposite in phase to the second reception vector, (b) calculates a fourth reception vector by multiplying a third reception vector of any data subcarrier received by the first antenna by a coefficient that is obtained by interpolating the complex coefficient, and (c) adds the fourth reception vector to a fifth reception vector of the any data subcarrier received by the second antenna.

Effect of the Invention

According to the above-described wireless communication system, an interference wave can be suppressed.

BRIEF DESCRIPTION OF THE DRAWINGS

FIG. 11 is a diagram illustrating demodulation data selection by a data selection unit of FIG. 10.

DETAILED DESCRIPTION OF THE EMBODIMENTS

Figure 1:
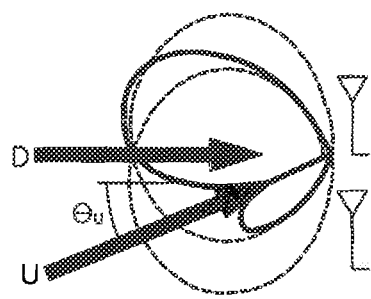
FIG. 1 is a diagram illustrating a null control technique which uses multiple antennas.

In the present specification, a wireless signal is grasped in a general complex plane. Further, the digital signal is treated as a complex signal which is I+jQ configured by I-phase and Q-phase signals obtained by performing a general quadrature detection. Therefore, a complex adder, a complex multiplier, and a complex FIR filter are used when a complex number is treated.

In the embodiment, a transmitter transmits a non-signal (a signal in a non-transmission period or a sub-carrier which uses a null carrier), a receiver uses the non-signal as an interference wave suppression pilot signal, calculates a complex coefficient for two received signals to have the same amplitude and opposite phases, multiplies one received signal by the complex coefficient, and adds the one received signal to the other received signal, and thereby, an interference wave is suppressed. Further, the complex coefficient is calculated for each OFDM symbol and sub-carrier by using discrete interference wave suppression pilot signals to suppress an interference wave with frequency selective fading of the interference wave and time fluctuation.

According to the embodiment, in a wireless communication system which uses an OFDM modulation method that is highly resistant to the frequency selective fading, the interference wave can be effectively suppressed by using two antennas in an environment with long delay multipath and the frequency selective fading.

Hereinafter, embodiments and examples will be described with reference to the drawings. In the following description, the same configuration elements may be denoted by the same reference numerals and repetitive description may be omitted.

First Embodiment

Figure 2:
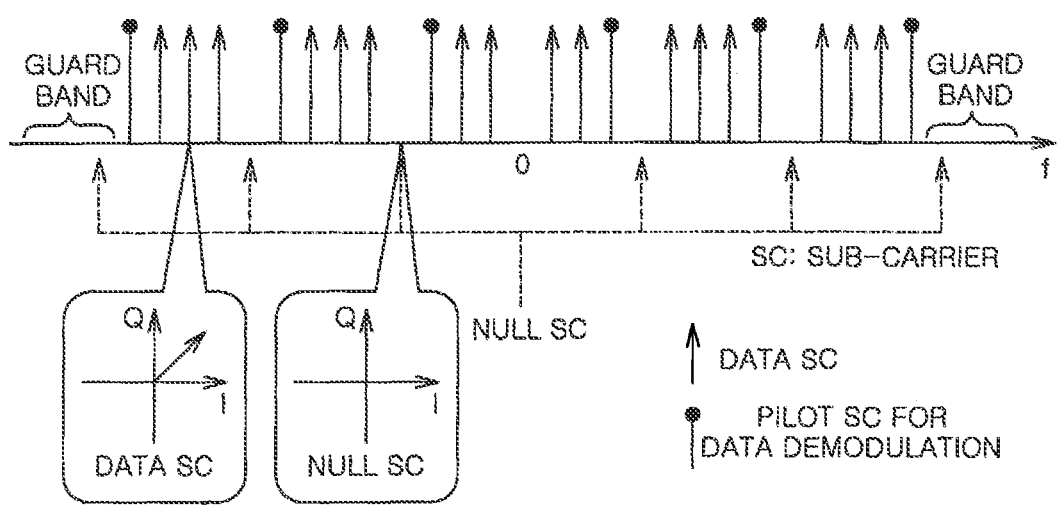
FIG. 2 is a diagram illustrating an example of an arrangement of sub-carriers of a transmission signal according to a first embodiment

A transmitter according to the first embodiment appropriately inserts zero-signal components (null sub-carriers) into a transmission signal for an orthogonal frequency-division multiplexing (OFDM) modulation, and transmits the OFDM modulated signal. FIG. 2 illustrates an example of an arrangement of sub-carriers in a transmission signal according to the first embodiment. A data sub-carrier is preferably quadrature amplitude modulation (QAM) data information. A pilot sub-carrier for data demodulation is used to perform a synchronous detection with known information in the transmitter and a receiver. The null sub-carrier is used for interference wave suppression.

Figure 3:
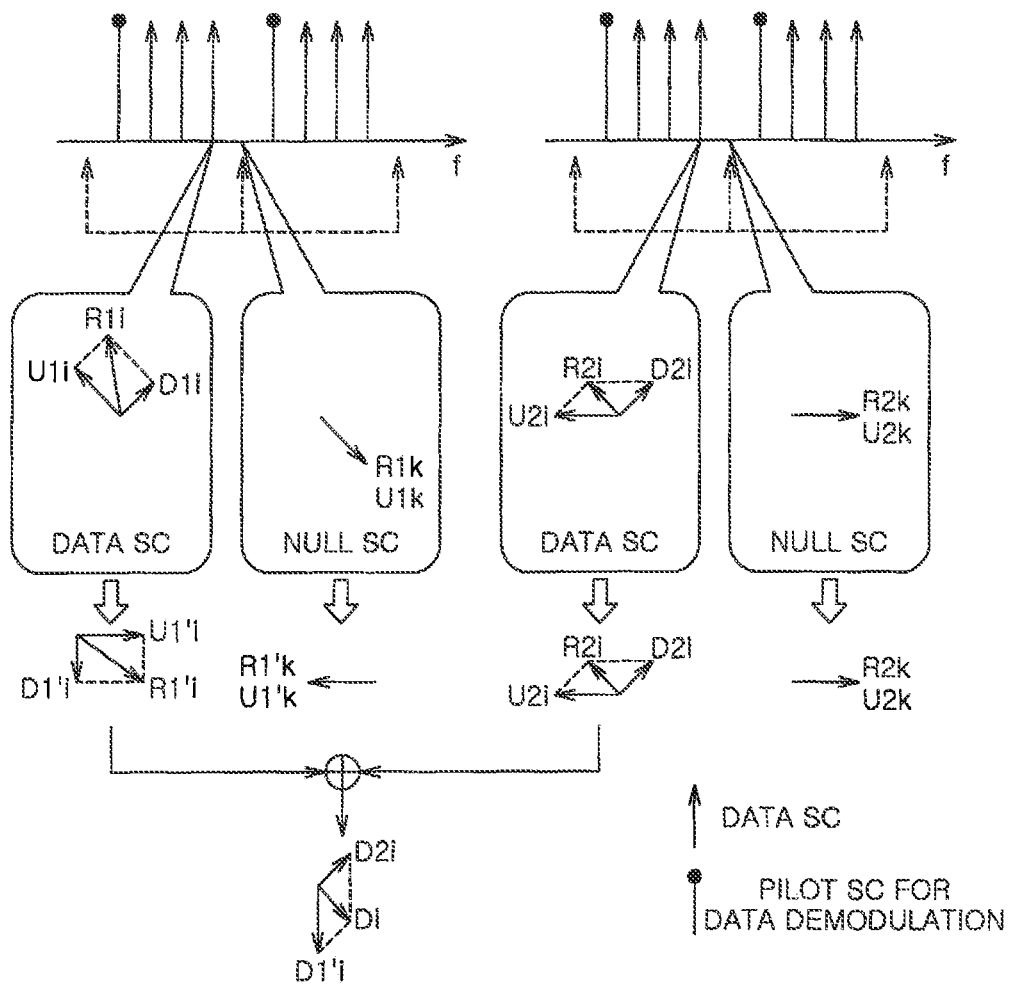
FIG. 3 is a diagram illustrating sub-carrier vectors after OFDM demodulation and sub-carrier vectors after interference suppression.

A receiver according to the first embodiment receives a signal by two antennas. A signal received by a first antenna is R1, and a signal received by a second antenna is R2. FIG. 3 illustrates sub-carrier vectors after OFDM demodulation and sub-carrier vectors after interference suppression. An i-th data sub-carrier and a pilot sub-carrier for data demodulation of the first antenna become a reception vector R1$i$ in which an interference wave U1$i$ is vector-added to a desirable wave D1$i$. An i-th data sub-carrier and a pilot sub-carrier for data demodulation of the second antenna become a reception vector R2$i$ in which an interference wave U2$i$ is vector-added to a desirable wave D2$i$. An interference wave U1$k$ of the first antenna for a k-th null sub-carrier on the transmission side becomes a reception vector R1$k$. An interference wave U2$k$ of the second antenna for a k-th null sub-carrier on the transmission side becomes a reception vector R2$k$. The reason why the received signal of the first antenna differs from the received signal of the second antenna is that there is a difference in propagation environment such as a propagation path difference or a multipath difference caused by a relationship between a location of an antenna and an arrival direction.

The sub-carriers $R_{1k}$ and $R_{2k}$ nullified on the transmission side, which are obtained by OFDM-demodulating the received signal, are used as the interference wave suppression pilot signals. A complex coefficient $A_k$ is obtained so that $R_{1k}$ can have the same amplitude as $R_{2k}$ and the opposite phase to $R_{2k}$. Assuming that an amplitude component of $R_{1k}$ is referred to as $a_{1k}$, a phase component of $R_{1k}$ is referred to as $\theta_{1k}$, an amplitude component of $R_{2k}$ is referred to as $a_{2k}$, and a phase component of $R_{2k}$ is referred to as $\theta_{2k}$, $A_k$ can be calculated by the following equation (1):

$$R_{1k}=a_{1k}\cdot\exp\{-j\theta_{1k}\}, R_{2k}=a_{2k}\cdot\exp\{-j\theta_{2k}\},$$

$$A_k=-(a_{2k}/a_{1k})\cdot\exp\{-j(\theta_{2k}-\theta_{1k})\} \qquad \text{Eq. (1).}$$

$R_{1'k}$ obtained by multiplying $R_{1k}$ by $A_k$ has the same amplitude as $R_{2k}$ and an opposite phase to $R_{2k}$. $R_{1'i}$ is obtained by multiplying $A_k$ by $R_{1i}$. If $R_{1'i}$ is added to $R_{2i}$, interference wave components $U_{1'i}$ and $U_{2i}$ are canceled out, and thereby, a desirable signal component $D_i$ in which $D_{1'i}$ is added to $D_{2i}$ is extracted. That is, the interference wave can be suppressed.

The wireless communication system according to the first embodiment includes a transmitter that inserts a null sub-carrier into a transmission signal and transmits the OFDM-modulated transmission signal, and a receiver that receives signals by the first antenna and the second antenna.

The receiver (a) calculates a complex coefficient $A_k$ wherein a result that a first reception vector $R_{1K}$ of a null subcarrier obtained by Fourier-transforming a signal received by the first antenna is multiplied by the complex coefficient $A_k$ is equal to an amplitude of a second reception vector $R_{2K}$ of a null subcarrier obtained by Fourier-transforming a signal received by the second antenna and is opposite in phase to the second reception vector, (b) calculates a fourth reception vector $R_{1'i}$ by multiplying a third reception vector $R_{1i}$ of the sub-carrier, which is received by the first antenna and Fourier-transformed, by the complex coefficient $A_k$, and (c) calculates a sixth reception vector $D_i$ by adding the fourth reception vector $R_{1'i}$ to a fifth reception vector $R_{2i}$ of the sub-carrier which is received by the second antenna and Fourier-transformed. Further, a desirable signal is extracted by calculating the fourth reception vector $R_{1'i}$ and the sixth reception vector $D_i$ for each of all the sub-carriers.

Here, the receiver may be configured with a first receiver that receives a signal by the first antenna and a second receiver that receives a signal by the second antenna.

Next, three examples will be used to describe a method of calculating the complex coefficients of all sub-carriers.

A first example is an example which uses a complex coefficient for each sub-carrier interpolated for all sub-carriers from a complex coefficient of sub-carriers into which a plurality of null sub-carriers are discretely inserted.

One interference wave suppression sub-carrier (SC) is inserted per (N+1) sub-carriers. Each of the other N sub-carriers is a data SC or a pilot SC for data demodulation. Interference suppression complex coefficients Ai for the N sub-carriers are obtained by interpolating the interference wave suppression pilot SC. Interpolation methods include a zero-order extrapolation which uses the latest interference wave suppression pilot SC as it is, a first-order interpolation of two interference wave suppression pilot SCs having an interpolation target sub-carrier therebetween, a least square method, and various known interpolation methods. FIG. 3 is an example of the zero-order extrapolation. Further, N=0, that is, a certain OFDM symbol may be used only for the interference wave suppression pilot SC. At this time, smoothing may be performed by using a low pass filter or the like so as to reduce an influence of noise or an error. It is especially effective when an interference wave has frequency dependence, such as when there are frequency selective fading or multiple narrowband interference waves. The smaller the value of N, the smaller the influence of the frequency dependence.

The second example is an example which uses a complex coefficient for each symbol interpolated for all OFDM symbols from a complex coefficient of OFDM symbols into which a plurality of null sub-carriers are discretely inserted.

One interference wave suppression SC is inserted per (M+1) OFDM symbols. Subcarriers of the other M symbols are data SCs or pilot SCs for data demodulation. An interference wave complex coefficient Ai(t) for the sub-carriers of the M symbols are obtained by interpolating the interference wave suppression pilot SC. Interpolation methods include a zero-order extrapolation which uses the latest interference wave suppression pilot SC as it is, a first-order interpolation of two interference wave suppression pilot SCs having an interpolation target OFDM symbols therebetween, a least square method, and various known interpolation methods. Further, M=0, that is, a certain sub-carrier may be used only for the interference wave suppression pilot SC. At this time, in order to reduce an influence of noise or an error, values of the same subcarriers before or after the corresponding symbol may be weighted and averaged. The present embodiment is especially effective when there is time variation in an interference wave, such as fading or shadowing. As M becomes smaller, an influence of high-speed time variation can be reduced.

Figure 4:
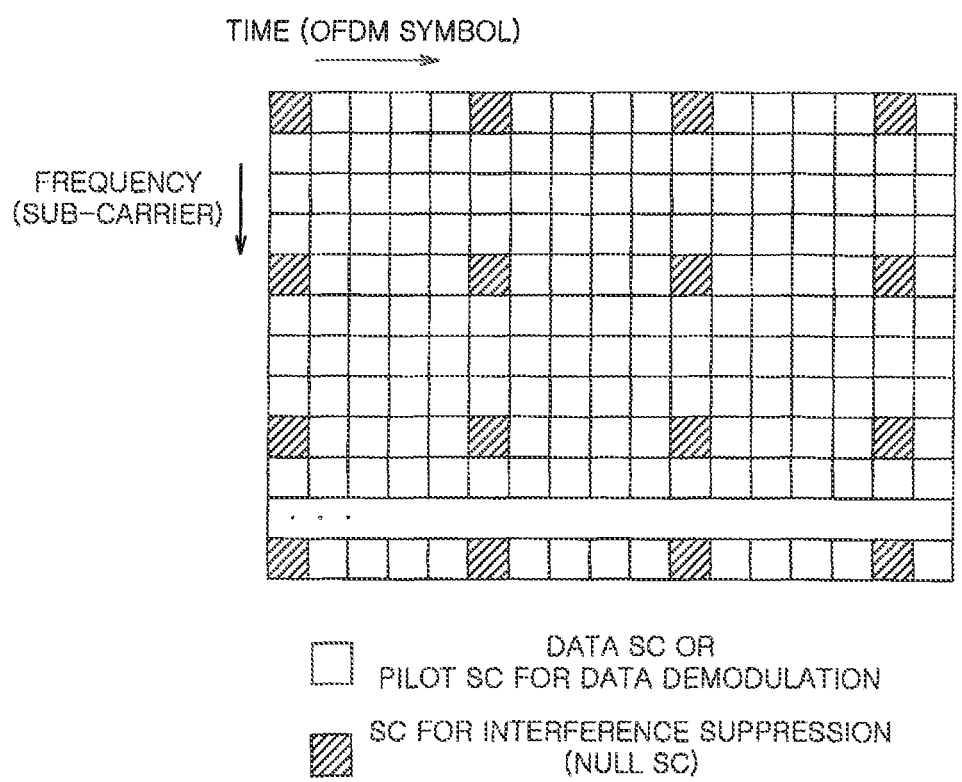
FIG. 4 is a diagram illustrating an example of a case where both a frequency domain and a time domain are interpolated.
Figure 5:
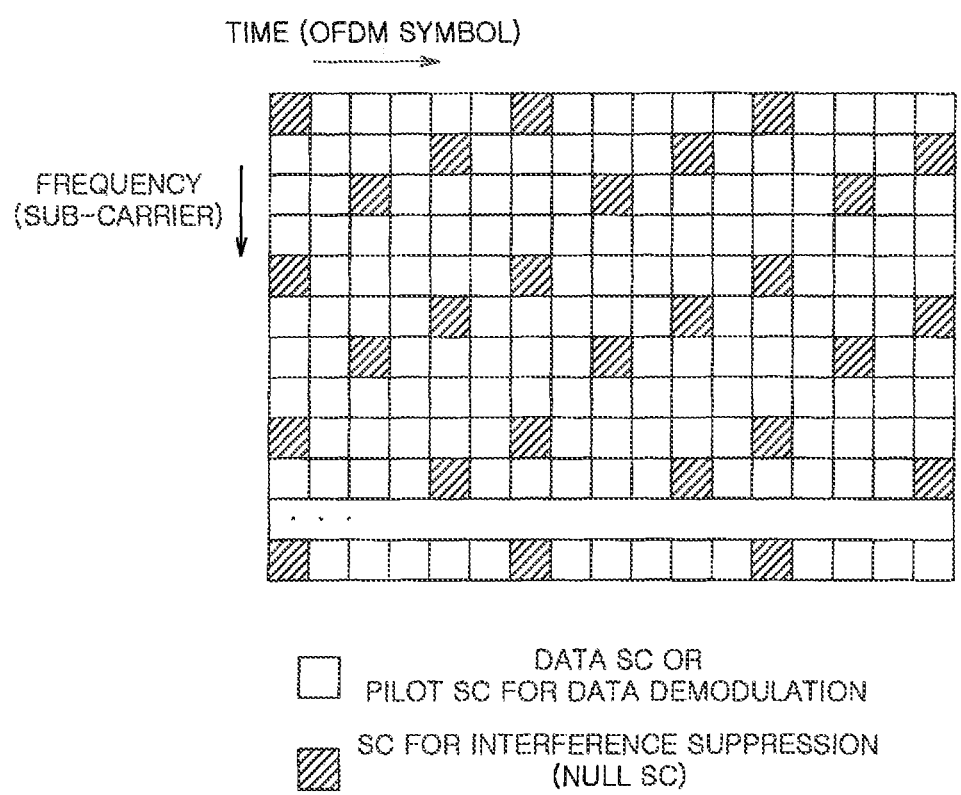
FIG. 5 is a diagram illustrating another example of case where both the frequency domain and the time domain are interpolated.

The third example is an example in which both frequency domain and time domain are interpolated. The order of interpolation may be from either. FIGS. 4 and 5 illustrate examples in which both the frequency domain and the time domain are interpolated. A horizontal axis is a time axis of an OFDM symbol unit, and a vertical axis is a frequency axis of a sub-carrier unit.

Since resource allocations of time and frequency are generally made for multi-user interference in the same system, an effect of the present embodiment is small. However, there is a constant effect for inter-cell interference. At this time, in the example illustrated in FIG. 5, an arrangement of null sub-carriers in the adjacent cell may be shifted in a frequency direction or in a time direction, and a signal is allocated such that the interference wave suppression pilot SC does not overlap, that is, such that the signal of the adjacent cell exists at a frequency of the interference wave suppression pilot SC of a certain cell.

Further, the interference wave suppression pilot SCs does not have to be regularly arranged. The number of interference wave suppression pilot SCs may be increased or decreased depending on a situation of a transmission path. It is only necessary for a transmission side and a reception side to know the arrangement of the interference wave suppression pilot SCs.

Second Embodiment

Figure 6:
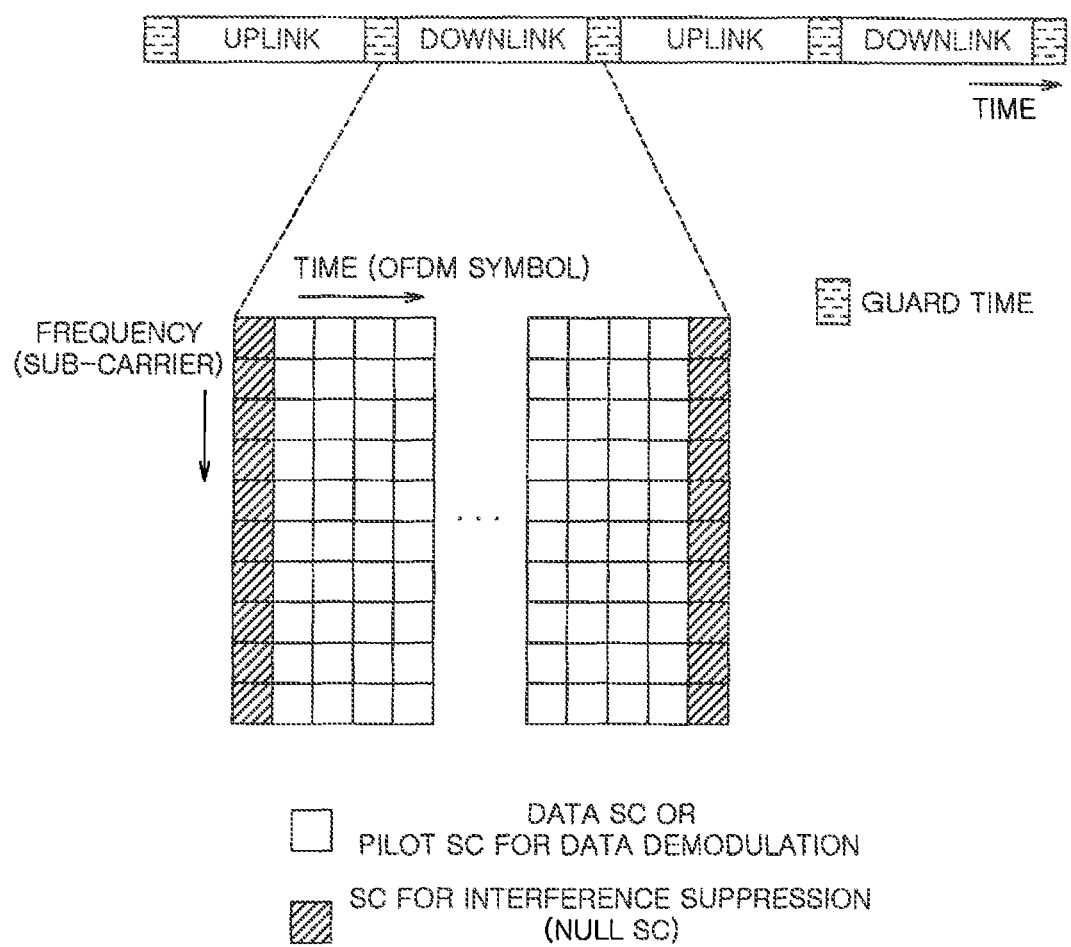
FIG. 6 is a diagram illustrating a TDD radio frame and an arrangement of OFDM sub-carriers according to a second embodiment.

FIG. 6 illustrates an example of a TDD radio frame and an arrangement of OFDM sub-carriers. A TDD system is Time Division Duplex (TDD) which divides time into a downlink and an uplink by time, and it is common to set a guard time interval between the downlink and the uplink. If a signal in a non-transmission period is set to the null sub-carrier in the first embodiment, the null sub-carrier is inserted into a transmission signal, and thereby, an interference wave can be suppressed as in the first embodiment. On the reception side, a virtual OFDM symbol in the guard time as a non-transmission period is OFDM-demodulated and is used as an interference wave suppression pilot SC. Both the downlink and the uplink may be extrapolated in zero order using a value immediately before the received frame or may be interpolated by using the values immediately before and after the received frame. Further, a guard time usually used in the OFDM method may be used as a non-transmission period, or an OFDM symbol dedicated to an interference pilot may be provided in a non-transmission period.

A wireless communication system according to the second embodiment includes a transmitter that transmits a transmission signal, and a receiver that receives signals by the first antenna and the second antenna.

The receiver (a) calculates the complex coefficient $A_k$ for each sub-carrier, wherein a result of multiplying the first reception vector $R_{1K}$ obtained by OFDM-demodulating a signal received by the first antenna in a non-transmission period by the complex coefficient $A_k$ is equal to an amplitude of the second reception vector $R_{2K}$ obtained by OFDM-demodulating a signal received by the second antenna and is opposite in phase to the second reception vector (b) interpolates the complex coefficient $A_K$ calculated for each sub-carrier, for all OFDM symbols, (c) calculates a fourth reception vector $R_{1'i}$ by multiplying a third reception vector $R_{1i}$ of all sub-carriers of all the OFDM symbols by the interpolated complex coefficient $A_k$, and (d) calculates a sixth reception vector $D_i$ by adding the fourth reception vector $R_{1'i}$ to a fifth reception vector $R_{2i}$.

Here, the receiver may be configured with a first receiver that receives a signal by the first antenna and a second receiver that receives a signal by the second antenna.

Next, an interference suppression circuit and a demodulation circuit used in the first embodiment or the second embodiment will be described.

First Example

Figure 7:
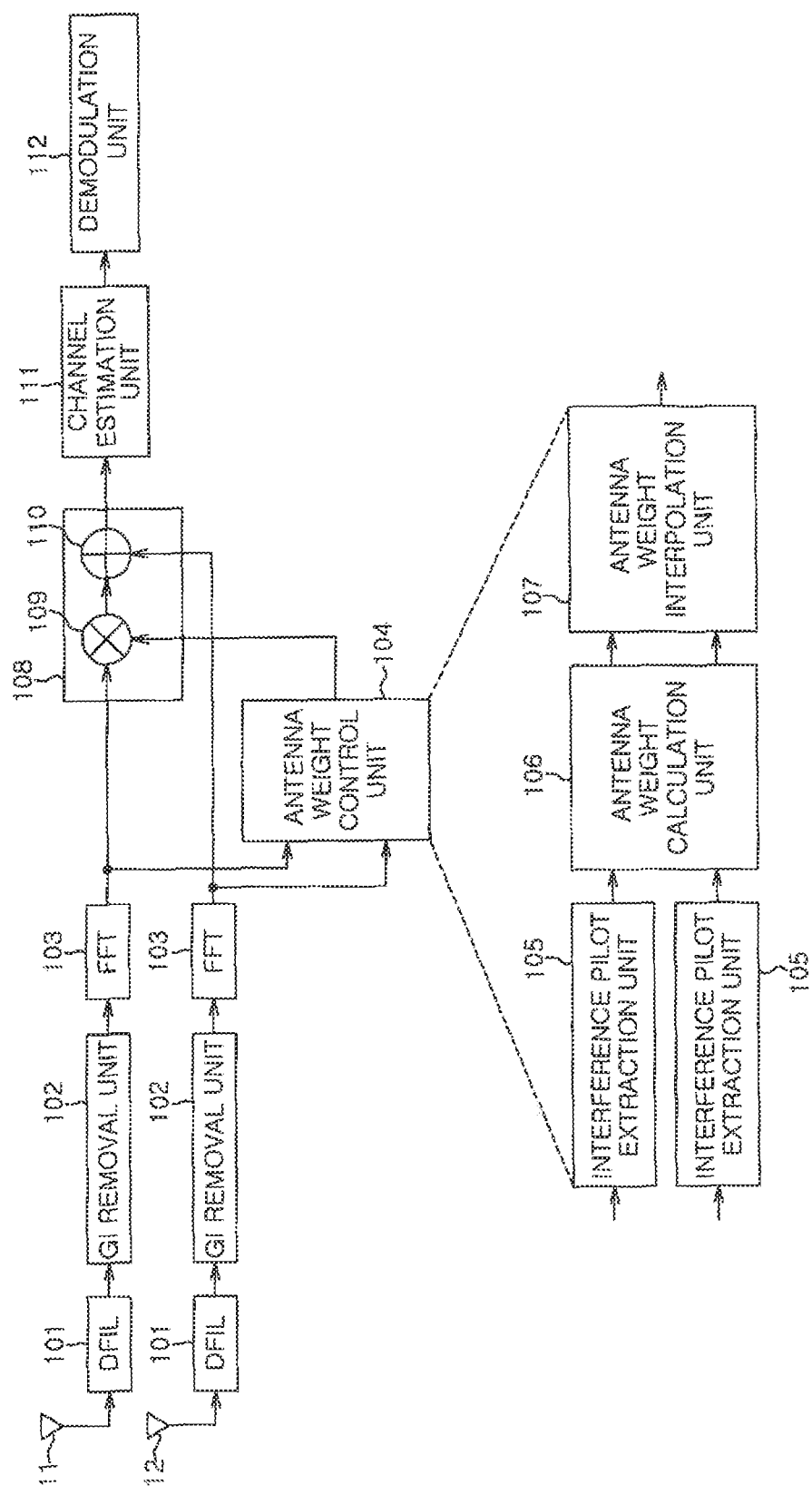
FIG. 7 is a block diagram of an interference suppression and demodulation circuit according to a first example.

FIG. 7 illustrates a block diagram of an interference suppression and demodulation circuit according to a first embodiment. Reception signals received by a first antenna 11 and a second antenna 12 are respectively downsampled to be OFDM-demodulated by sampling rate conversion units (DFILs) 101. An input signal of the sampling rate conversion unit 101 is a signal which is frequency-converted from a radio frequency signal into a baseband signal and is sampled over a sampling rate for OFDM demodulation. The sampling rate conversion unit 101 is configured by a decimation filter and the like.

A guard interval added to a transmission signal is appropriately removed by a guard interval removing unit (GI removal unit) 102 from an output signal of the sampling rate conversion unit 101, and then the output signal is converted by the Fourier transform unit (FFT) 103 into a signal in the frequency domain. The guard interval removing unit 102 and the Fourier transform unit 103 are used for a general OFDM demodulator or the like, and the Fourier transform unit 103 uses a fast Fourier transform (FFT) or the like.

An output signal of the Fourier transform unit 103 is input to an antenna weight control unit 104. An interference pilot extraction unit 105 extracts data of a null SC for interference suppression as in the examples of FIGS. 4 to 6. An antenna weight calculation unit 106 calculates an antenna weight (complex coefficient) from the extracted data of the null SC, for example, by using Equation (1). As in the examples of FIGS. 4 to 6, the null SCs are discretely arranged in the time domain, the frequency domain, or both the time domain and the frequency domain, and thereby, an antenna weight interpolation unit 107 performs interpolation in the time domain and the frequency domain, and calculates antenna weights for each symbol (time domain) and each sub-carrier (frequency domain). Interpolation methods include a zero-order extrapolation which uses the latest interference wave suppression pilot SC as it is, a first-order interpolation of two interference wave suppression pilot SCs having an interpolation target sub-carrier therebetween, a least square method, and various known interpolation methods.

An interference suppression unit 108 suppresses an interference signal by using the calculated antenna weights. The antenna weight calculated by the antenna weight interpolation unit 107 is multiplied by the output signal of the Fourier transform unit 103 by a complex multiplier 109 for each sub-carrier. Since an interference component of an output signal of the complex multiplier 109 has the same amplitude and an opposite phase with respect to a frequency signal of the second antenna 12, the added signal at an adder 110 becomes a signal in which an interference is suppressed. The interference-suppressed signal is a signal having a large amount of desirable wave components, that is, a signal having a high signal to interference ratio (SIR), and a general OFDM demodulation processing is performed for the interference-suppressed signal.

A channel estimation unit 111 estimates a transmission path of an OFDM desirable wave, and a demodulation unit (Demod.) 112 performs an OFDM demodulation such as detection. The channel estimation unit 111 can be omitted for a differential modulation-delay detection and the like.

Further, FIG. 7 illustrates an example in which the antenna weight is applied only to a signal of the first antenna 11, but weights may be applied to signals of the first antenna 11 and the second antenna 12 by performing calculation using the following Equation (2):

$$R_{1k}=a_{1k}\cdot\exp\{-j\theta_{1k}\}, R_{2k}=a_{2k}\cdot\exp\{-j\theta_{2k}\}$$

$$A_1=-a_{2k}\cdot\exp\{-j(\theta_{2k})\}, A_2=a_{1k}\cdot\exp\{-j(\theta_{1k})\} \quad \text{Eq. (2).}$$

In this case, the complex multiplier 109 is also required for a signal of the second antenna 12. That is, FIG. 7 is an example in which an antenna weight of the signal of the second antenna 12 is set to 1.0 when using Equation (2).

The receiver according to the first example includes the guard interval removing unit 102 that removes a signal in a guard interval period to demodulate an OFDM signal, the Fourier transform unit 103 that transforms a received signal from which the guard interval is removed into a signal in the frequency domain, the antenna weight control unit 104 that controls a complex coefficient from the Fourier-transformed signal, the interference suppression unit 108 that applies an interference coefficient to the Fourier-transformed reception signal to thereby suppress an interference wave signal component included in the reception signal, and the OFDM demodulation unit 112.

The antenna weight control unit 104 includes the interference pilot extraction unit 105 that extracts an interference suppression pilot signal from the Fourier-transformed received signal, the antenna weight calculation unit 106 that calculates a complex coefficient from the extracted interference suppression pilot signal, and the antenna weight interpolation unit 107 that calculates complex coefficients of all sub-carriers from the calculated complex coefficient.

The interference suppression unit 108 includes the complex multiplier 109 that multiplies the Fourier-transformed received signal by the complex coefficient calculated by the antenna weight control unit 104, and the adder 110 that adds together the two received signals multiplied by the complex coefficient.

Second Example

Figure 8:
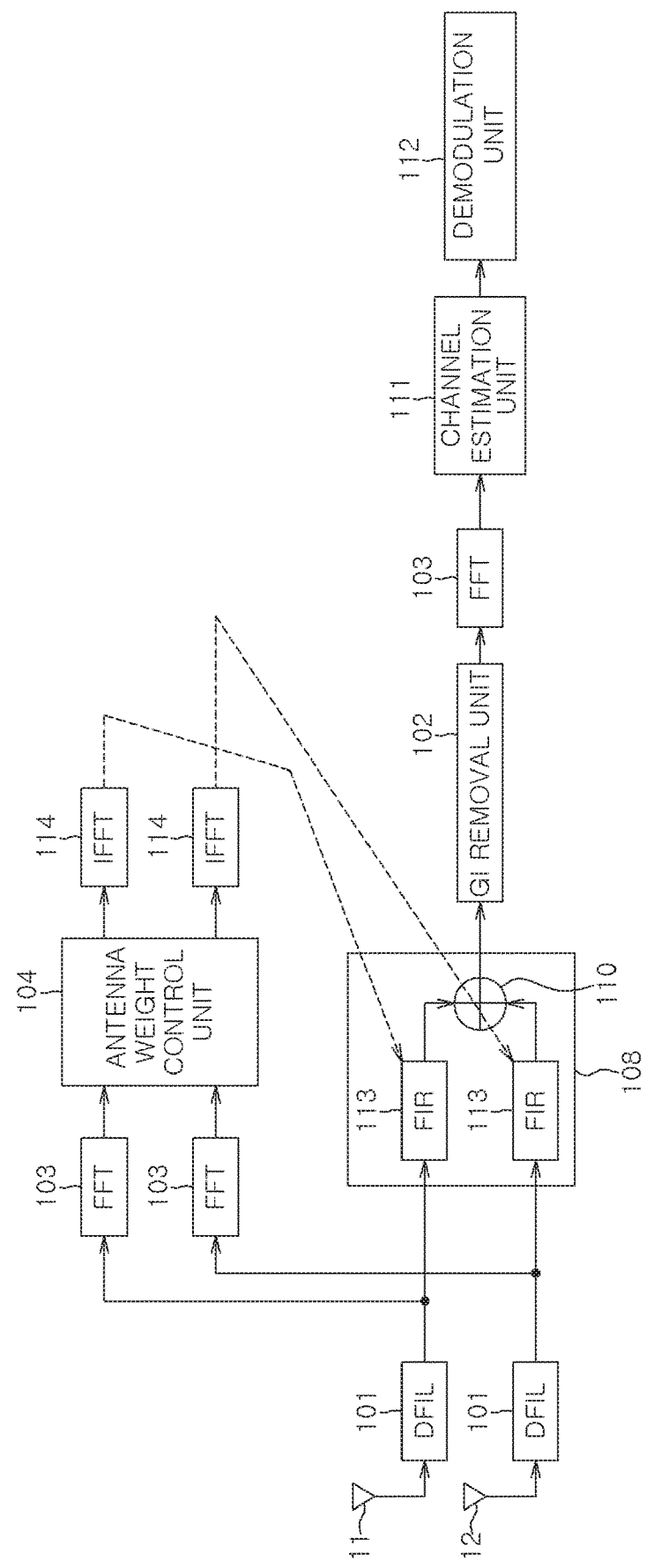
FIG. 8 is a block diagram of an interference suppression and demodulation circuit according to a second example.

FIG. 8 illustrates a block diagram of an interference suppression and demodulation circuit according to a second example. The same component as in the first embodiment is denoted by the same symbol or reference numeral. Output signals of the sampling rate conversion units 101 respectively connected to the first antenna 11 and the second antenna 12 are converted into signals in the frequency domain by the Fourier transform units 103 and input to the antenna weight control unit 104, and antenna weights of the output signals are calculated for each sub-carrier (frequency domain). The antenna weights for each sub-carrier (frequency domain) are inverse-Fourier-transformed by inverse Fourier transform units (IFFT) 114 and become convolution coefficients in the time domain. The convolution coefficients are set as coefficients of finite impulse response (FIR) filters (transform filters) 113 of the interference suppression unit 108.

Output signals of the sampling rate conversion units 101 are input to the interference suppression unit 108, and an interference signal is suppressed by using the calculated antenna weights. Since interference components of the signals of the first antenna 11 and the second antenna 12 whose antenna weights are convoluted by the FIR filters 113 have the same amplitude and opposite phases, an added signal from the adder 110 becomes a signal in which interference is suppressed.

The interference-suppressed signal is a signal with many desirable wave components, that is, a signal with a high SIR, and a general OFDM demodulation processing is performed for the interference-suppressed signal. A guard interval added to the transmission signal is appropriately removed by a guard interval removing unit 102, a transmission path of an OFDM desirable wave is estimated by a channel estimation unit 111, and OFDM demodulation such as detection is performed by a demodulation unit 112. The channel estimation unit 111 can be omitted for differential modulation-delay detection or the like.

Further, although FIG. 8 illustrates an example in which antenna weights are calculated by using Equation (2) which applies the antenna weights to signals of the first antenna 11 and the second antenna 12, a weight may be calculated by using Equation (1) and applied only to the antenna 11. In this case, one of the FIR filters 113 is not required.

A receiver according to the second example includes the Fourier transform unit 103 that transforms a received signal into a signal in the frequency domain, and the antenna weight control unit 104 that controls a complex coefficient from a Fourier-transformed signal in a period in which a desirable wave is not transmitted, the inverse Fourier transform unit 114 that transforms a complex coefficient in the frequency domain into a convolution complex coefficient in the time domain, the interference suppression unit 108 that suppresses an interference wave signal component included in the received signal by applying the convolution complex coefficient in the time domain to the received signal, the guard interval removing unit 102 that removes a signal in a guard interval period in order to demodulate an OFDM signal, the Fourier transform unit 103 that transforms the received signal from which the guard interval is removed into a signal in the frequency domain, and the OFDM demodulation unit 112.

The interference suppression unit 108 includes the FIR filter 113 that performs convolution of the receive signal with the convolution complex coefficient in the time domain, and an adder 110 that adds together two received signals in which the complex coefficients are convoluted.

Third Example

Figure 9:
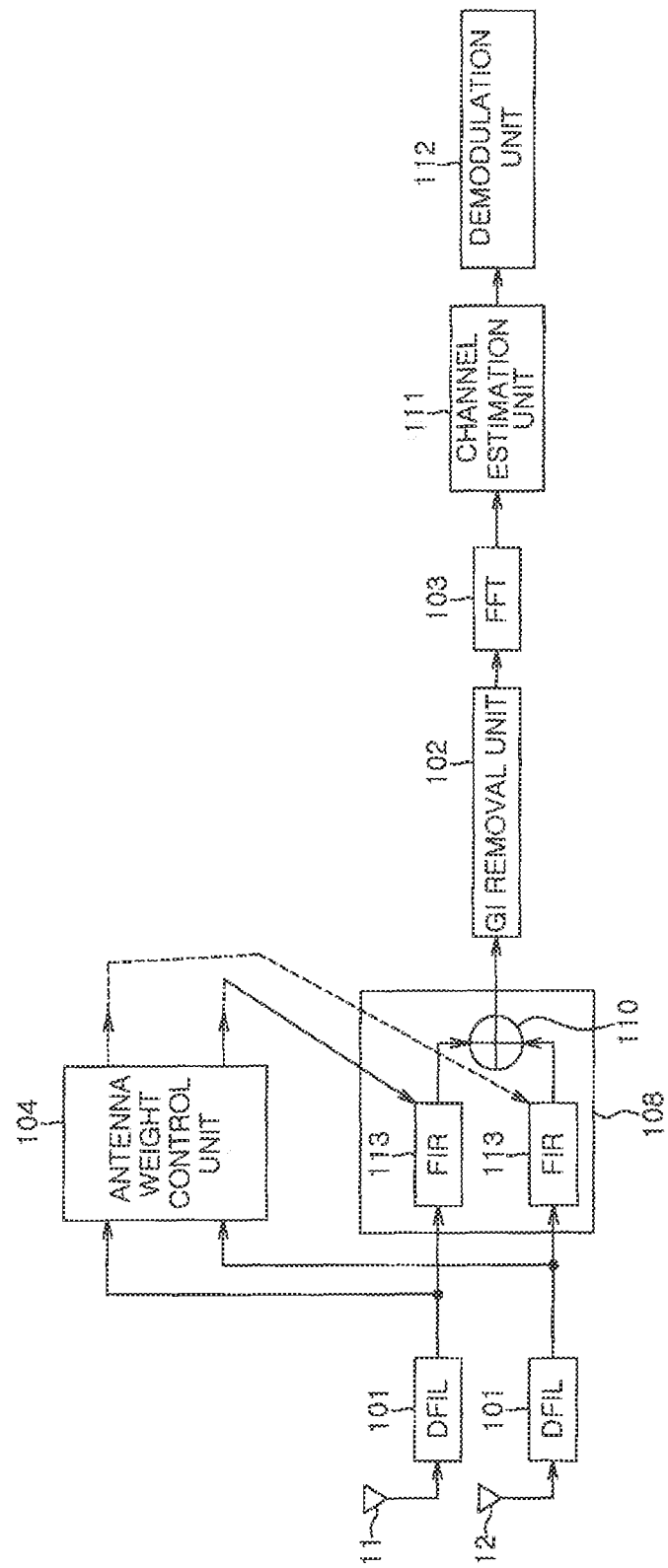
FIG. 9 is a block diagram of an interference suppression and demodulation circuit according to a third example.

FIG. 9 illustrates a block diagram of an interference suppression and demodulation circuit according to a third example. The same configuration elements as in the first and second embodiments are denoted by the same symbols or reference numerals. The circuits according to the third embodiment can be applied to a case of using a guard time signal as illustrated in FIG. 6 (second embodiment). The antenna weight control unit 104 simultaneously samples the received signals of the first antenna 11 and the second antenna 12 in the time period when there is only an interference wave and there is no desirable signal, and uses the sampled signals as filter coefficients of the FIRs without processing. At this time, the received signal of the first antenna 11 is set to the coefficient of the FIR filter 113 of the second antenna 12, the received signal of the second antenna 12 is set to the coefficient of the FIR filter 113 of the first antenna 11, and a sign of one filter coefficient is inverted. That is −1 is multiplied thereto. This means that a phase is rotated 180 degrees. Since interference components of the signals of the first antenna 11 and the second antenna 12 whose antenna weights are convoluted by the FIR filters 113 have the same amplitude and opposite phases, an added signal at the adder 110 becomes a signal in which interference is suppressed. The subsequent demodulation of the OFDM signal is the same as in the second embodiment of the interference suppression circuit and demodulation circuit. If a signal in which only interference waves of the entire band are present is used, the interference pilot extraction unit 105 and the antenna weight interpolation unit 107 are not required, and a sign may be inverted according to the calculation of Equation (2). As a result, the Fourier transform unit 103 and the inverse Fourier transform unit 114 are not required, and thus, a circuit configuration can be simplified.

A receiver according to the third example includes, the antenna weight control unit 104 that samples signals received by the first antenna 11 and the second antenna 12 in a time period in which a desirable wave is not present, sets the sampled signal of the second antenna 12 in the time period in which the desirable wave is not present to a convolution complex coefficient of the first antenna 11 in the time domain, and sets the sampled signal of the second antenna 12 in the time period in which the desirable wave is not present to a convolution complex coefficient of the second antenna 12 in the time domain, the FIR filter 113 that performs convolution of the received signal and a convolution complex coefficient in the time domain, the adder 110 that adds together two received signals in which the complex coefficients are convoluted, and the guard interval removing unit 102 that removes a signal in a guard interval period in order to demodulate an OFDM signal, the Fourier transform unit 103 that transforms the received signal from which the guard interval is removed into a signal in the frequency domain, and the OFDM demodulation unit 112.

Fourth Example

Next, an example in which a data selection circuit is used for the interference suppression circuit and demodulation circuit will be described.

Figure 10:
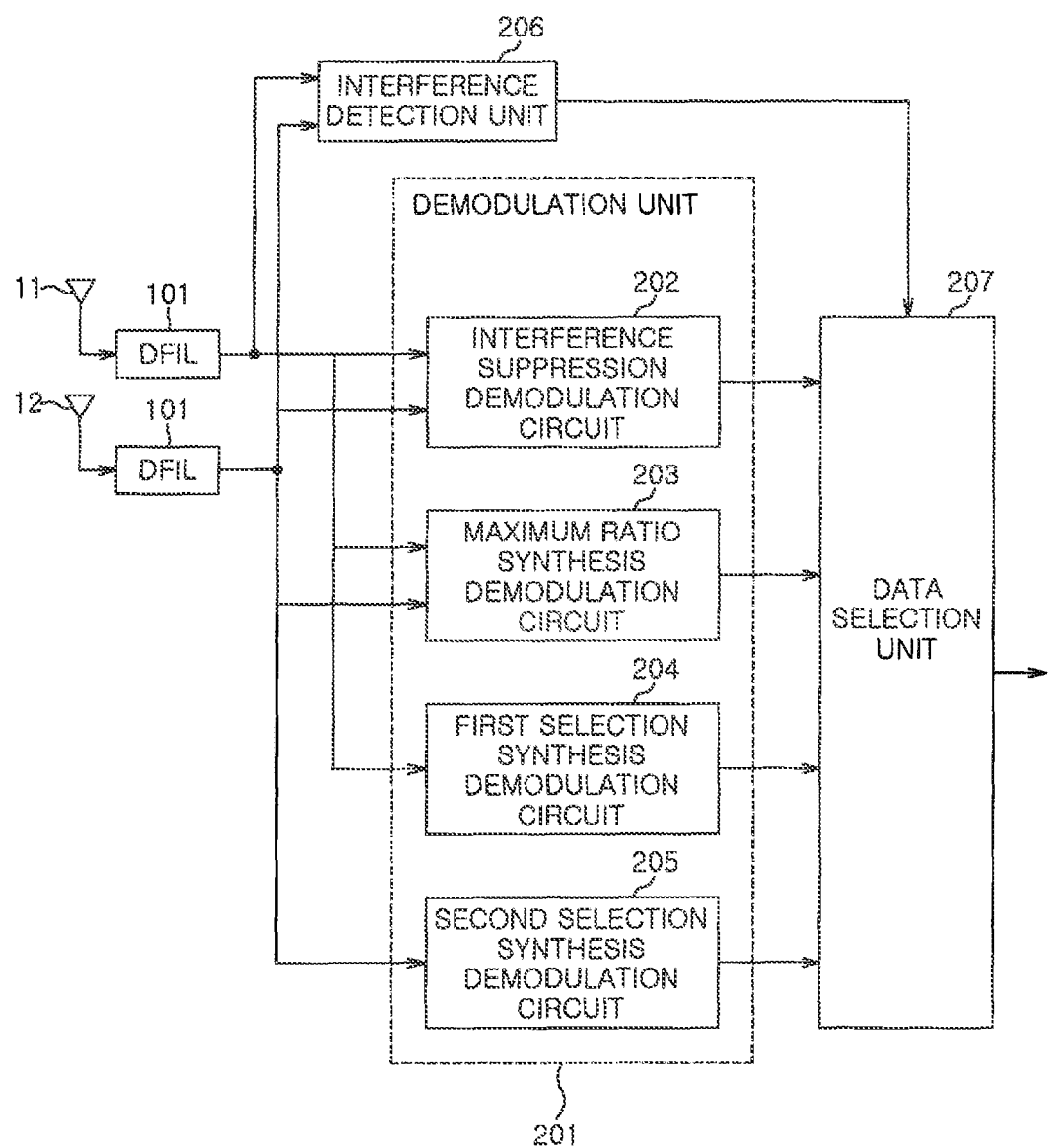
FIG. 10 is a block diagram of an interference suppression and demodulation circuit according to a fourth example.

FIG. 10 illustrates a block diagram of the interference suppression and demodulation circuit according to a fourth embodiment. The received signals of the first antenna 11 and the second antenna 12 are input to the sampling rate conversion units 101. The input signal is a baseband signal that is sampled over a sampling rate for performing an OFDM demodulation. The sampling rate conversion unit 101 is configured by a decimation filter and the like.

Output signals of the sampling rate conversion units 101 are input to a demodulation unit 201. The demodulation unit 201 has four types of demodulation function units such as an interference suppression demodulation circuit 202, a maximum ratio synthesis demodulation circuit 203, a first selection synthesis demodulation circuit 204 which uses a signal of the first antenna 11, and a second selection synthesis demodulation circuit 205 which uses a signal of the second antenna 12. The respective demodulation function units simultaneously perform parallel processing to perform the OFDM demodulation. The interference suppression demodulation circuit 202 is the interference suppression and demodulation circuit, and the like according to the first embodiment, the second embodiment or the third embodiment. The maximum ratio synthesis demodulation circuit 203 performs the OFDM demodulation by performing a maximum ratio synthesis which is a known technique used in antenna diversity of a system including multiple antennas. The first selection synthesis demodulation circuit 204 and the second selection synthesis demodulation circuit 205 perform the OFDM demodulation, each using one received signal.

The received signals of the first antenna 11 and the second antenna 12 are also input to the interference detection unit 206. The interference detection unit 206 has a function of performing Fourier transform of the received signal to measure SIR for each band. As illustrated in FIG. 11, the data selection unit 207 selects one of the demodulation data of the interference suppression demodulation circuit 202, the maximum ratio synthesis demodulation circuit 203, the first selection synthesis demodulation circuit 204, and the second selection synthesis demodulation circuit 205 of the demodulation unit 201, based on the measured SIR. That is, when a signal to interference and noise ratios (SINRs) of the first antenna 11 and the second antenna 12 are high, the demodulation data of the maximum ratio synthesis demodulation circuit 203 is selected. When the SINR of one of the first antenna 11 and the second antenna 12 is high and the SINR of the other is low, the demodulation data of a selection synthesis (the first selection synthesis demodulation circuit 204 or the second selection synthesis demodulation circuit 205) with the high SINR is selected. When the SINRs of the first antenna 11 and the second antenna 12 are low, the demodulation data of the interference suppression demodulation circuit 202 is selected. A threshold is provided for determination of a magnitude of the SINR. The threshold may be determined as a required SINR at the time of demodulating a quadrature amplitude modulation, or by other methods such as experimentally acquiring the threshold.

Figure 12:
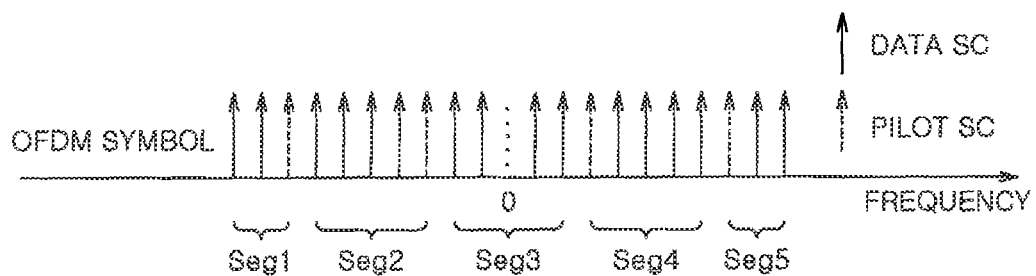
FIG. 12 is a diagram illustrating a relationship between OFDM symbols and segments.

Here, the interference detection unit 206 will be described. Preferably, as illustrated in FIG. 12, the OFDM sub-carriers are divided into several segments (Seg1, Seg2, Seg3, Seg4, and Seg5), each SINR is measured, and the data selection unit 207 selects the demodulation data for each segment.

Figure 13:
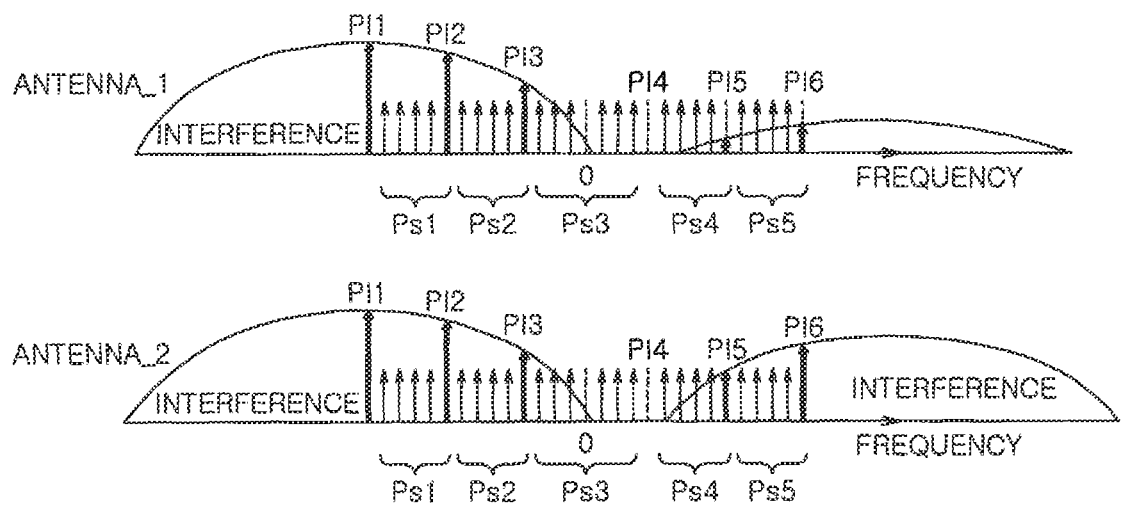
FIG. 13 is a diagram illustrating a first example of an interference detection unit of FIG. 10.

FIG. 13 is a diagram illustrating an interference detection unit of a first example and is an example in a case of using the null sub-carriers in FIGS. 4 and 5. Signal power and interference power received by each of the first antenna (ANTENNA_1) 11 and the second antenna (ANTENNA_2) 12 are measured. The signal power like $P_{S1}$ to $P_{S5}$ is obtained by measuring an average power of data sub-carriers and demodulation pilot sub-carriers in each segment. The interference power is obtained by measuring powers $P_{I1}$ to $P_{I6}$ of the sub-carriers to which the null sub-carrier is allocated. Regarding the interference power of the present example, an SINR is calculated by using the higher one of the interference powers at both ends of each segment. This is because the SINR is not high when there is a partial interference wave such as the segment 3 (Seg3). The data selection unit 207 selects the demodulation data of the interference suppression demodulation circuit 202 for the segments 1 to 3 (Seg1, Seg2, and Seg3), and selects the demodulation data of the first selection synthesis demodulation circuit 204 for the segments 4 and 5 (Seg4 and Seg5).

Figure 14:
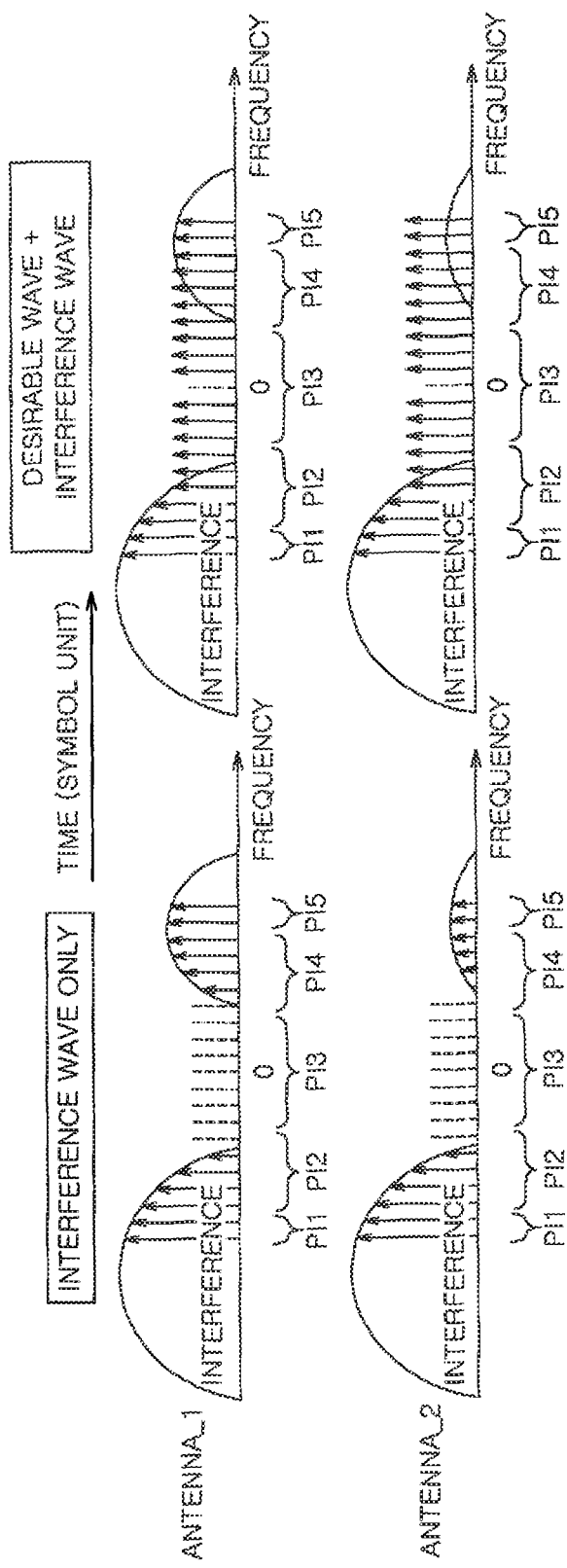
FIG. 14 is a diagram illustrating a second example of the interference detection unit of FIG. 10.

FIG. 14 is a diagram illustrating an interference detection unit of a second example and is an example in a case of using a guard time signal illustrated in FIG. 6. The interference detection unit measures the signal power and the interference power received by each of the first antenna (ANTENNA_1) 11 and the second antenna (ANTENNA_2) 12. First, the interference detection unit measures powers of each sub-carrier during the time period when only the interference wave exists, and sets the maximum values for each segment to the interference powers $P_{I1}$ to $P_{I6}$ (because the SINR is not high when there is a partial interference wave). Next, the signal power like $P_{S1}$ to $P_{S3}$ is obtained by measuring an average power of data sub-carriers and the demodulation pilot sub-carriers in each segment at the time when a desirable wave is also present. The data selection unit 207 selects the demodulation data of the interference suppression demodulation circuit 202 for the segments 1 and 2 (Seg1 and Seg2), selects the demodulation data of the maximum ratio synthesis demodulation circuit 203 for the segment 3 (Seg3), and selects the demodulation data of the second selection synthesis demodulation circuit 205 for the segments 4 and 5 (Seg4 and Seg5).

A receiver according to the fourth embodiment includes the interference detection unit 206 that detects an interference wave which does not satisfy an interference power ratio to a signal necessary for demodulating the OFDM signal for each of the received signals of the respective antennas and for each of segments divided in the frequency domain, the demodulation unit 201 that includes the interference suppression demodulation circuit 202, the maximum ratio synthesis demodulation circuit 203, the first selection synthesis demodulation circuit 204, and the second selection combining demodulation circuit 205, and the data selection unit 207 that selects demodulation data from outputs of demodulation circuits for each frequency segment in accordance with the interference detection result.

The interference suppression demodulation circuit 202 uses any one of the first embodiment, the second embodiment, and the third embodiment.

Figure 15:
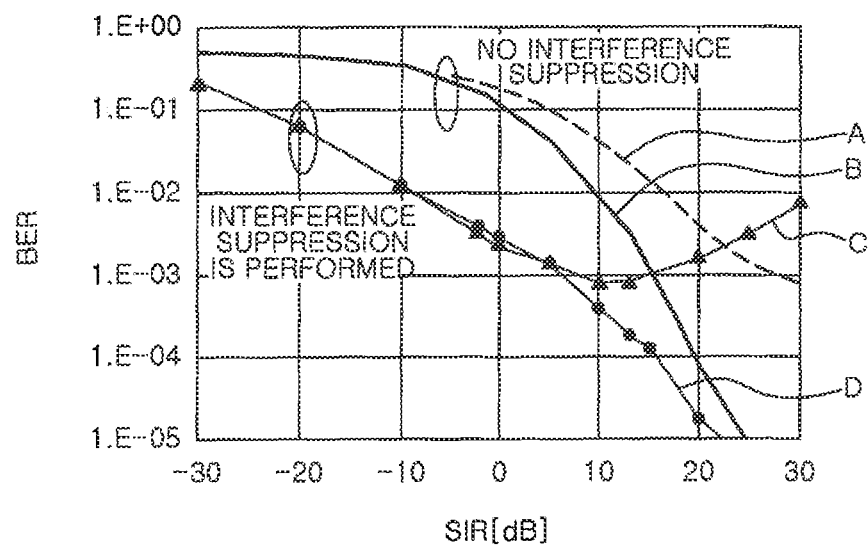
FIG. 15 is a BER characteristic diagram illustrating effects of interference suppression and data selection according to the fourth example.

FIG. 15 is a diagram illustrating an effect of interference suppression and data selection according to the fourth embodiment. Bit error rate (BER) characteristics with SIR as an index can be obtained by simulation. A desirable wave and an interference wave are set in an independent multipath rayleigh fading environment since they have different propagation paths. A signal to noise ratio (SNR) is set to 40 dB. The OFDM signal is illustrated in FIG. 4. "A" of FIG. 15 uses only the received signal of the first antenna 11, and "B" performs a maximum ratio synthesis of the first antenna 11 and the second antenna 12. "C" always performs interference suppression. "D" performs data selection with a threshold of the data selection circuit of FIG. 10 (fourth embodiment) set to 15 dB. If the interference suppression is used, an improvement effect is large when the SIR is low, and for example, it can be seen that the SIR is improved by approximately 20 dB when BER=$10^{-2}$. It can be seen that, in "C", if the SIR is greater than or equal to 10 dB, the BER is reduced although the desirable signal power is high.

Figure 16:
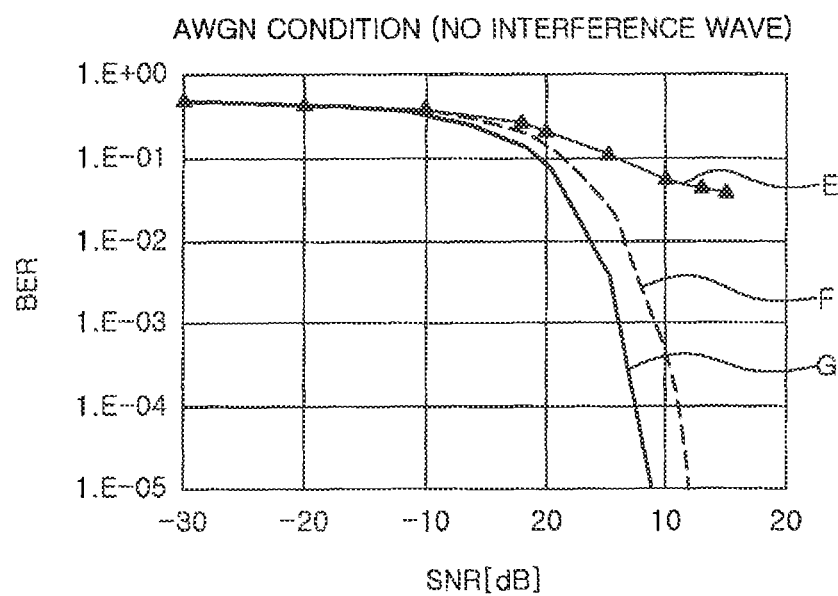
FIG. 16 is a BER characteristic diagram in a case where no interference wave exists.

FIG. 16 illustrates the BER characteristics when there is no interference wave. A propagation path of the desirable wave has no fading and has a condition of only additive white Gaussian noise (AWGN). A horizontal axis is the SNR. It can be seen that "E" of FIG. 16 has interference suppression of AWGN only, "F" corresponds to "A" of FIG. 15, and "G" corresponds to "B" of FIG. 16. Unlike "F" and "G", it can be seen that "E" is reduced at SNR greater than or equal to −10 dB. The reason is that the interference wave can be suppressed because the interference waves of the first antenna 11 and the second antenna 12 are correlated with each other, but thermal noise (Noise) has no correlation and suppression processing is performed despite the fact that there is no suppression and thereby the SNR at the time of OFDM demodulation is reduced. In order to avoid this problem, the data selection unit 207 according to the fourth embodiment selects the demodulation data depending on the environment, and thus, it can be seen that the BER characteristics are best. It is also effective when there is partially interfering with a band of the OFDM signal.

Although the invention made by the inventor is specifically described based on the embodiments and examples, it is needless to say that the present invention is not limited to the above-described embodiments and examples, and various changes may be made.

DESCRIPTION OF REFERENCE NUMERALS

11: first antenna
12: second antenna
101: sampling rate conversion unit
102: guard interval removing unit
103: Fourier transform unit
104: antenna weight control unit
105: interference pilot extraction unit
106: antenna weight calculation unit
107: antenna weight interpolation unit
108: interference suppression unit 109: complex multiplier
110: adder
111: channel estimation unit
112: demodulation unit
113: FIR filter
114: inverse Fourier transform unit
201: demodulation unit
202: interference suppression demodulation circuit
203: maximum ratio synthesis demodulation circuit
204: selection synthesis demodulation circuit
205: selection synthesis demodulation circuit
206: interference detection unit
207: data selection unit

What is claimed is:

1. A wireless communication system comprising:
a transmitter configured to transmit an OFDM-modulated signal; and
a receiver configured to receive signals by a first antenna and a second antenna,
wherein the transmitter discretely inserts a plurality of null subcarriers into a transmission signal in time and frequency domains and transmits the transmission signal, and wherein the receiver calculates a complex coefficient, wherein a result of multiplying the complex coefficient by a first reception vector for each of the null subcarriers received by the first antenna is equal to an amplitude of a second reception vector of a corresponding null subcarrier received by the second antenna and is opposite in phase to the second reception vector, and
wherein the receiver calculates a fourth reception vector by multiplying a third reception vector of any data subcarrier received by the first antenna by a coefficient that is obtained by interpolating the complex coefficient, and adds the fourth reception vector to a fifth reception vector of the any data subcarrier received by the second antenna.

2. The wireless communication system of claim 1,
wherein positions of the null subcarriers to be inserted change in time, and
wherein the complex coefficient for the any data subcarrier is obtained by using a complex coefficient for each subcarrier that is interpolated in at least the frequency domain for all subcarriers from the complex coefficient calculated based on the null subcarriers.

* * * * *